(No Model.)

T. T. PROSSER.
Car Wheel.

No. 231,096. Patented Aug. 10, 1880.

Witnesses.
Inventor.

UNITED STATES PATENT OFFICE.

TREAT T. PROSSER, OF CHICAGO, ILLINOIS.

CAR-WHEEL.

SPECIFICATION forming part of Letters Patent No. 231,096, dated August 10, 1880.

Application filed May 10, 1880. (No model.)

*To all whom it may concern:*

Be it known that I, TREAT T. PROSSER, a citizen of the United States, residing at Chicago, in the county of Cook and State of Illinois, have invented certain new and useful Improvements in Cylinder-Car Wheels, (Case B;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to car-wheels especially adapted for rolling-cylinder freight-cars of the character described in various United States patents granted to me on the 17th day of February, 1880; and it relates more particularly to a car-wheel of this kind described in my application for a patent filed of even date with the application for this patent, and the structural peculiarity of which consists, mainly, of a dome-shaped web cast in one piece with the flanged tire of the wheel.

One object of this invention is to modify the structure of the wheel in such a way as to provide for bolting the cylindrical shell of the car to the wheel.

Another object of the invention is to provide means for preventing the shifting of the grain in the dome-shaped web of the wheel.

To these ends the invention consists in reducing the diameter of the dome-shaped web and connecting the tire of the wheel to the base of the reduced dome-shaped web by an intervening vertical annular flange of sufficient width for conveniently bolting the cylindrical shell of the car thereto, preferably in the manner described in another application for a patent filed by me, of even date with the application for this patent.

It further consists in constructing the dome-shaped web with radial ribs on its interior surface.

Figure 1:
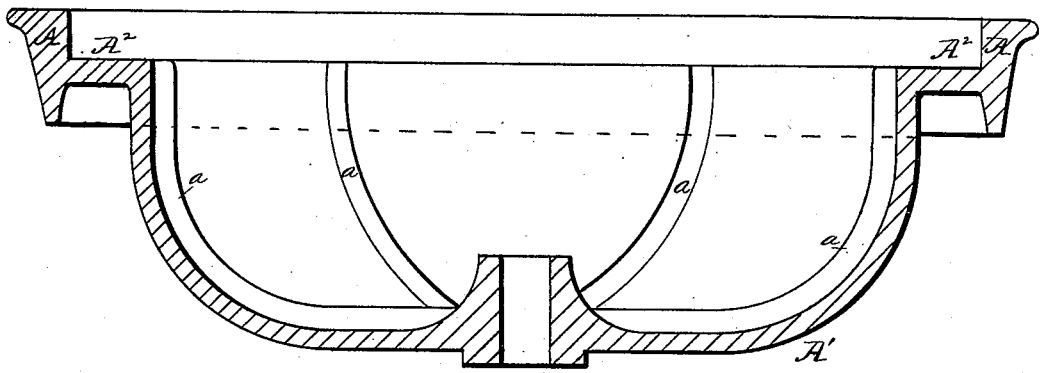
Figure 2:
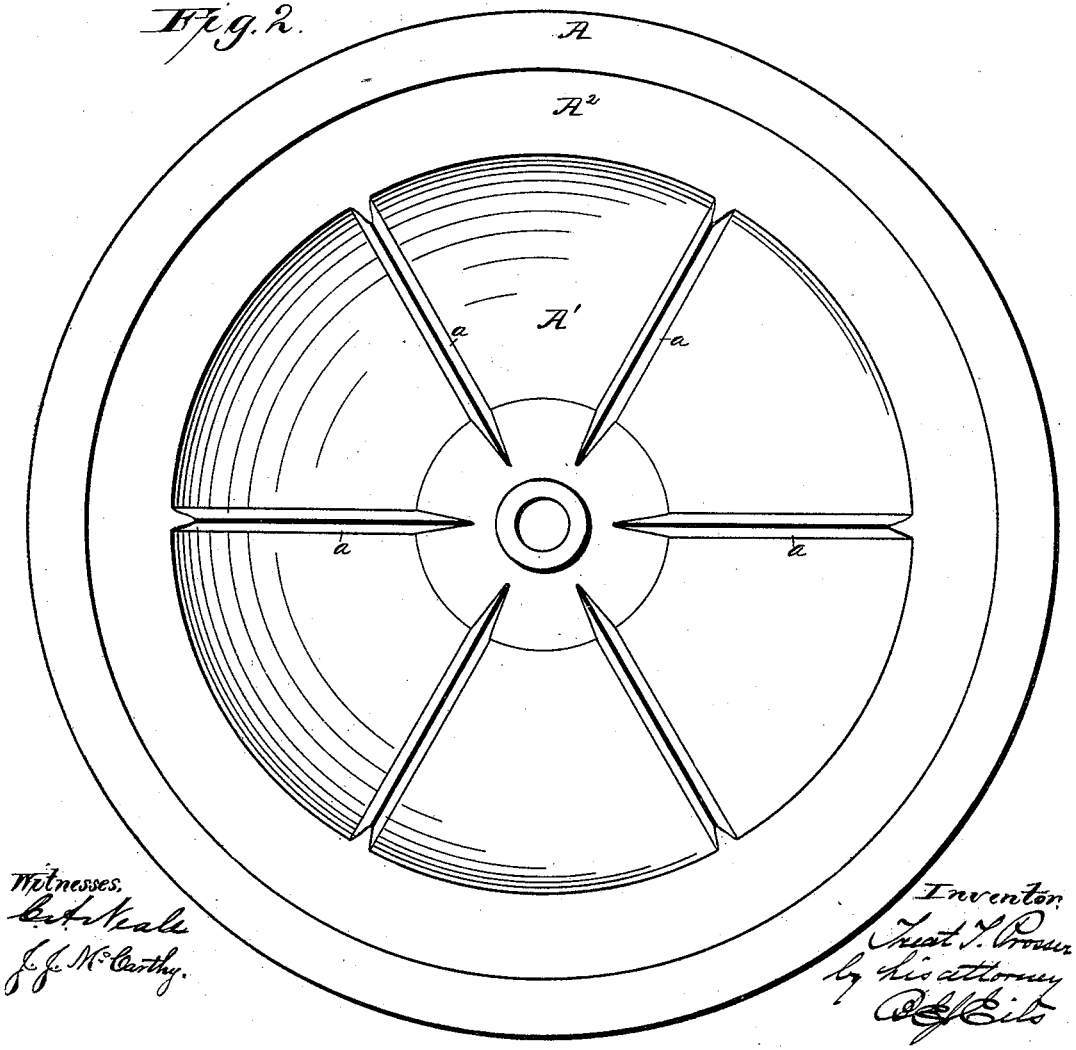

In the annexed drawings, Figure 1 is an axial section of the improved car-wheel. Fig. 2 is a side elevation thereof, showing the interior side of the wheel.

The same letters of reference are used in both the figures in the designation of identical parts.

The flanged tire A and dome-shaped web A' are connected by the vertical annular bolting flange or ring $A^2$, all cast in one piece. The base of the dome-shaped web projects into the flanged tire, so that the connecting bolting-ring may join the tire at about its mid-width, and thus brace and strengthen the tire The width of the bolting-ring of the wheel on the exterior side should be made sufficient to accommodate bolt heads or nuts.

The tire is bored out to the bolting-ring from its flanged side or edge, and the interior face of the bolting-ring may be also dressed, so that the wheel can be snugly and squarely fitted on the end of the shell of the cylinder-car.

The dome-shaped web is provided with a central hub for the reception of a gudgeon or journal. Its interior side has a series of radial ribs, $a$, formed upon it. These ribs are quite low, but effective in preventing attrition of the grain by shifting in the dome-shaped web.

I do not herein claim a cast car-wheel composed of a flanged tire and a dome-shaped web, nor such a wheel constructed with an interior shoulder, as these features, broadly considered, belong to the application for patent first hereinbefore mentioned; but

What I claim as new herein is—

1. A cast car-wheel composed of a flanged tire, a dome-shaped web of less diameter and a vertical annular bolting flange or ring connecting the flanged tire to the dome-shaped web, substantially as before set forth.

2. A cast car-wheel composed of a flanged tire, a dome-shaped web of less diameter extending part way into the tire, and a vertical annular bolting flange or ring connecting the base of the dome-shaped web to the tire at about its mid-width, substantially as before set forth.

3. A cast car-wheel having a dome-shaped web, the interior side of which is constructed with radial ribs and the flanged tire of which has a cylindrical bore, substantially as before set forth.

In testimony whereof I affix my signature in presence of two witnesses.

TREAT T. PROSSER.

Witnesses:
H. B. PROSSER,
H. W. ANDERSON.